(12) United States Patent
Verhoeven et al.

(10) Patent No.: US 9,049,962 B2
(45) Date of Patent: Jun. 9, 2015

(54) BEVERAGE PREPARATION DEVICE PROVIDED WITH A DISCHARGE THAT IS HEIGHT-ADJUSTABLE BY HAND

(75) Inventors: Romanus Eduard Verhoeven, Heerhugowaard (NL); Johannes Theodorus Emerentia Huiberts, Spanbroek (NL)

(73) Assignee: BRAVILOR HOLDING B.V., Heerhugowaard (NL)

( * ) Notice: Subject to any disclaimer, the term of this patent is extended or adjusted under 35 U.S.C. 154(b) by 31 days.

(21) Appl. No.: 13/982,442

(22) PCT Filed: Feb. 2, 2012

(86) PCT No.: PCT/NL2012/050057
§ 371 (c)(1),
(2), (4) Date: Oct. 2, 2013

(87) PCT Pub. No.: WO2012/108762
PCT Pub. Date: Aug. 16, 2012

(65) Prior Publication Data
US 2014/0021227 A1    Jan. 23, 2014

(30) Foreign Application Priority Data

Feb. 7, 2011   (NL) ...................................... 2006152
Jul. 28, 2011  (NL) ...................................... 2007192

(51) Int. Cl.
*B67D 1/00*      (2006.01)
*A47J 31/46*     (2006.01)
*A47J 31/44*     (2006.01)

(52) U.S. Cl.
CPC .............. *A47J 31/46* (2013.01); *A47J 31/4482* (2013.01)

(58) Field of Classification Search
CPC .............................. A47J 31/4482; A47J 31/46
USPC ................... 222/533–536, 74; 141/304, 387; 239/26, 27; 137/615
See application file for complete search history.

(56) References Cited

U.S. PATENT DOCUMENTS 3,410,487 A * 11/1968 Hyde .............................. 239/26
3,726,318 A *  4/1973 Hyde ....................... 137/625.41

(Continued)

FOREIGN PATENT DOCUMENTS

EP   0791321 A1   8/1997
EP   0867142 A1   9/1998
EP   1656863 A1   5/2006

OTHER PUBLICATIONS

International Search Report of PCT/NL2012/050057 dated Mar. 15, 2012.

(Continued)

*Primary Examiner* — Kevin P Shaver
*Assistant Examiner* — Robert Nichols, II
(74) *Attorney, Agent, or Firm* — Morgan, Lewis & Bockius LLP

(57) ABSTRACT

Beverage preparation device provided with a discharge (3) that is height—adjustable by hand characterized in that the discharge (3) comprises an adjustment arm (9) that is hingeably attached to a housing (4) in a hinge point (5) with a supply end (9a), wherein the adjustment arm can be pressed down or pushed up, which adjustment arm (9) at a delivery end (9b) is provided with a delivery head (6) with a delivery opening (7), wherein the delivery head (6) is pivotable around a pivot axis (2) arranged perpendicularly to the adjustment arm (9) by suspension from the adjustment arm (9) via hinge means (8a, 8b) arranged at the delivery end (9b) and arranged at the pivot axis (2), in such a way that the delivery opening (7) when pivoting the adjustment arm (9) maintains a substantially constant orientation.

14 Claims, 5 Drawing Sheets

(56) References Cited

U.S. PATENT DOCUMENTS

Figure 1:
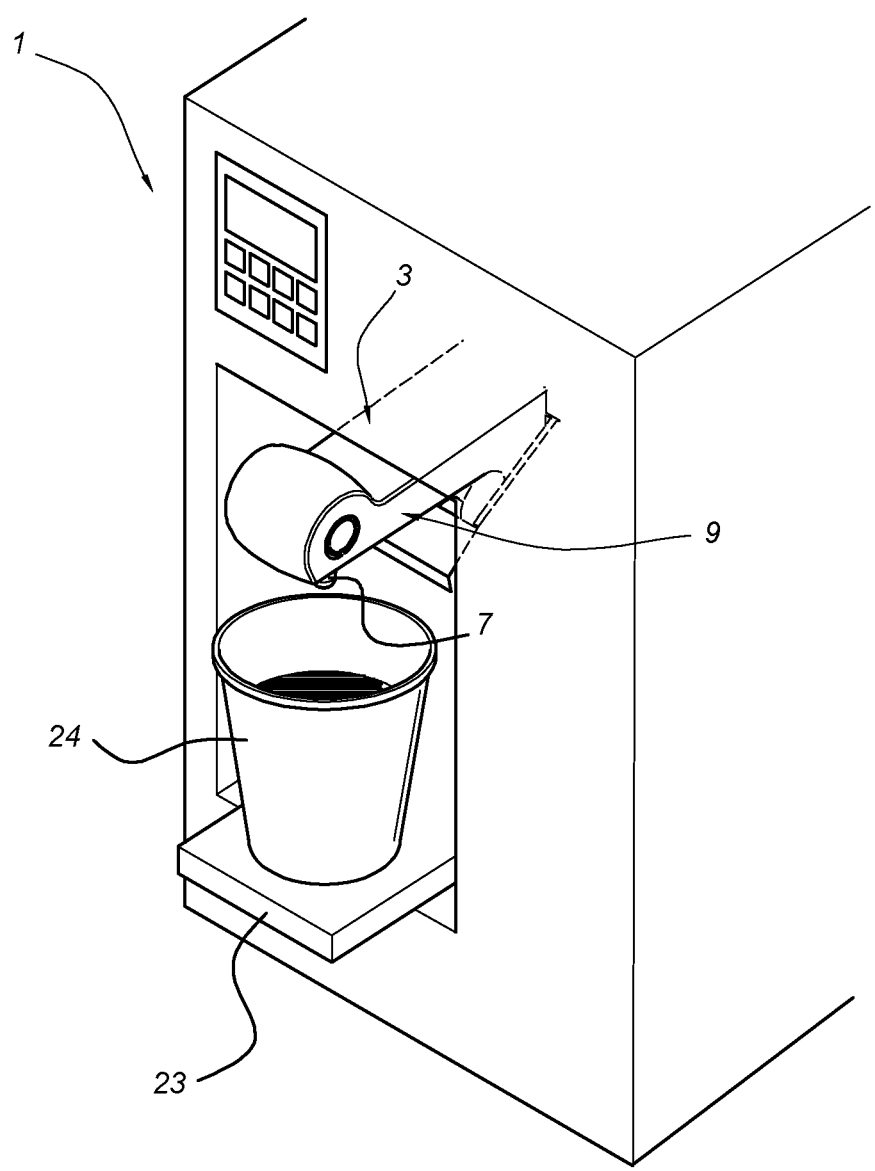

| | | | |
|---|---|---|---|
| 7,210,601 B2 * | 5/2007 | Hortin et | 222/144.5 |
| 7,793,690 B2 * | 9/2010 | Voglewede et al. | 141/362 |
| 8,070,076 B2 * | 12/2011 | Erickson et al. | 239/587.2 |
| 8,469,242 B2 * | 6/2013 | Kolon et al. | 222/538 |

OTHER PUBLICATIONS

Written Opinion of NL 2007192 dated Aug. 16, 2012.

* cited by examiner

BEVERAGE PREPARATION DEVICE PROVIDED WITH A DISCHARGE THAT IS HEIGHT-ADJUSTABLE BY HAND

CROSS REFERENCE TO RELATED APPLICATIONS

The present application is the 35 U.S.C. 371 National Stage of International Application Number PCT/NL2012/050057, filed Feb. 2, 2012, which claims priority from Netherlands patent application NL2006152, filed Feb. 7, 2011 and Netherlands patent application NL2007192, filed Jul. 28, 2011, the contents of each of which are incorporated herein by reference.

The invention relates to a beverage preparation device provided with a discharge that is height-adjustable by hand.

Such a preparation device is known from for example DE 29.810.291. This publication describes a coffee machine with a height-adjustable outlet adjustable by hand. The outlet comprises a housing in the shape of a collection tray that is height-adjustable with respect to the apparatus body of the beverage preparation device, in which a coffee delivery channel that is rigidly connected to the apparatus body discharges. In a lower part of the collection tray one or more delivery openings are provided for delivering coffee from the collection tray to the beverage container, such as a cup or a jug. The height of the outlet can be set manually by a user by means of a handle attached to the collection tray, with which the collection tray can be moved with respect to the apparatus body with the coffee delivery channel in vertical direction. The height-setting set by the user is maintained due to two magnets attached to the apparatus body attracting two strips of ferromagnetic material on the collection tray.

A disadvantage of such a beverage preparation device is that considerable force is required to adjust the height of the collection tray, because the collection tray encounters relatively a lot of friction upon movement as a consequence of surfaces rubbing against each other. Moreover, the magnets exert a relatively high, permanent attraction force on the strips of ferromagnetic material upon movement of the collection tray, further hindering adjustment of height.

It is therefore an aim of the invention to provide a beverage preparation device provided with a discharge that is height-adjustable by hand, wherein the height adjustment can be carried out more smoothly.

It is a further aim of the invention to provide a beverage preparation device wherein the discharge direction of the beverage is substantially constant for all settings.

To this end a beverage preparation device provided with a discharge that is height-adjustable by hand according to the invention is characterized in that the discharge device comprises an adjustment arm that is hingeably attached to a housing in a hinge point with a supply end, which adjustment arm at a delivery end is provided with a delivery head with a delivery opening, wherein the delivery head is pivotable around a pivot axis arranged perpendicularly to the adjustment arm by suspension from the adjustment arm via hinge means arranged at the delivery end and arranged at the pivot axis, in such a way that the delivery opening when pivoting the adjustment arm maintains a substantially constant orientation.

Due to the fact that the height adjustment mechanism uses an adjustment arm that is attached in a hinge point, is it easier to adjust the height of the discharge device: at pressing down or pushing up of the adjustment arm the user encounters a relatively small resistance since at merely one point a relatively small friction occurs and the height adjustment therefore requires less force. Therewith the bending moment exerted on the hinge point is boosted by the arm, through which the height adjustment can be carried out more smoothly.

Because the delivery head is also pivotable around a pivot axis arranged perpendicularly to the adjustment arm by suspension from the adjustment arm via hinge means arranged at the delivery end and arranged at the pivot axis, the orientation of the delivery head and the delivery opening at adjustment remains the same, in that the delivery head aligns with the gravity vector. The delivery opening will then usually follow a substantially vertical trajectory.

An embodiment relates to a beverage preparation device wherein the hinge means comprise hinge projections extending from the delivery head in opposite direction along the pivot axis, extending in hinge recesses comprised by the adjustment arm. In this way a relatively simple and reliable hinge connection between the delivery head and the adjustment arm is obtained.

A further embodiment relates to a beverage preparation device, wherein the hinge projections in the adjustment arm can be pressed inwardly from the outside via the hinge recesses by connection of the hinge projections with resilient means arranged on the delivery head, the resilient means being resilient along the pivot axis. Due to the fact that the hinge projections can be pressed inwardly from the outside, for example by using thumb and index finger, the user can easily break the connection between the hinge projections and the adjustment arm, in such a way that the delivery head can for example be taken apart for cleaning. The resilient means cause the hinge projections to remain positioned in the hinge recesses during use, in such a way that the delivery head does not fall out of the adjustment arm.

A yet further embodiment relates to a beverage preparation device, wherein the resilient means are arranged perpendicularly to the pivot axis and are provided with guidance projections that engage curved guidance grooves in the adjustment arm. The guidance projections and curved guidance grooves bring about that at hinging of the delivery head a better, more robust connection between the delivery head and the adjustment arm is obtained. The resilient means cause the guidance projections to remain well-positioned in the guidance grooves during use.

A yet even further embodiment relates to a beverage preparation device, wherein the adjustment arm comprises a discharge part and a cover detachably attached to the discharge part. To increase cleaning comfort, the adjustment arm can be made of a discharge part, through which the beverage flows to the delivery end and the delivery head, and a cover, wherein the cover is detachable. The cover therewith can be fixed to the discharge part. The cover therewith furthermore covers the delivery head at an upper side.

A yet further embodiment relates to a beverage preparation device, wherein the hinge means are arranged between the delivery head and the cover.

A further embodiment relates to a beverage preparation device, wherein the delivery head furthermore is pivotable around a further pivot axis arranged perpendicularly to the discharge part and running parallel to the pivot axis by suspension from the discharge part via further hinge means arranged at the delivery end and arranged on the further pivot axis, wherein the cover is shiftable in a longitudinal direction of the discharge part. Because the delivery head is pivotably connected to the discharge part as well as to the cover, the adjustment arm can be positioned in a position, without the delivery head "dangling". Additionally it is relevant that the cover is shiftable or movable in a similar way with respect to the discharge part.

A further embodiment relates to a beverage preparation device, wherein the adjustment arm is connected with the housing in the hinge point via a spring element and a friction device. The friction device causes the position as set during adjustment of the adjustment arm to be maintained with respect to the housing. The spring element therewith provides extra pressure on the friction device.

A yet further embodiment relates to a beverage preparation device, wherein the friction device is positioned between a locking ring and a fastener plate, outside of which a disc spring is positioned. The disc spring exerts pressure on the fastener plate, as a result of which this is being pressed against the friction ring.

A yet even further embodiment relates to a beverage preparation device, wherein the friction device comprises a friction ring. Since rotating movements of the adjustment arm occur, using a friction ring is advantageous.

An example of an embodiment of a beverage preparation device with a discharge device according to the invention will be illustrated with reference to the accompanying figures.

Figure 2:
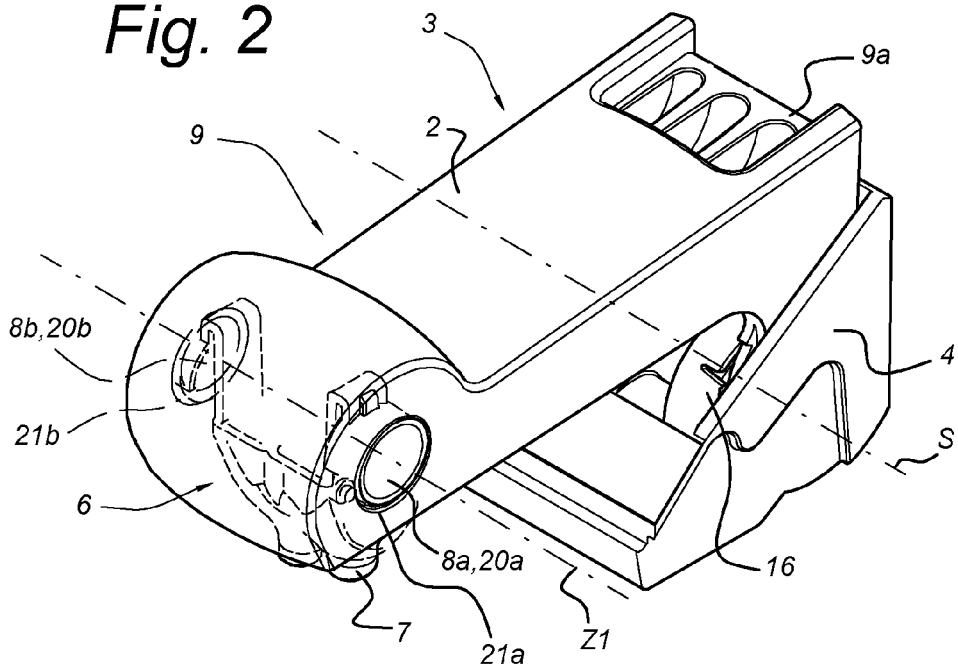
Figure 3:
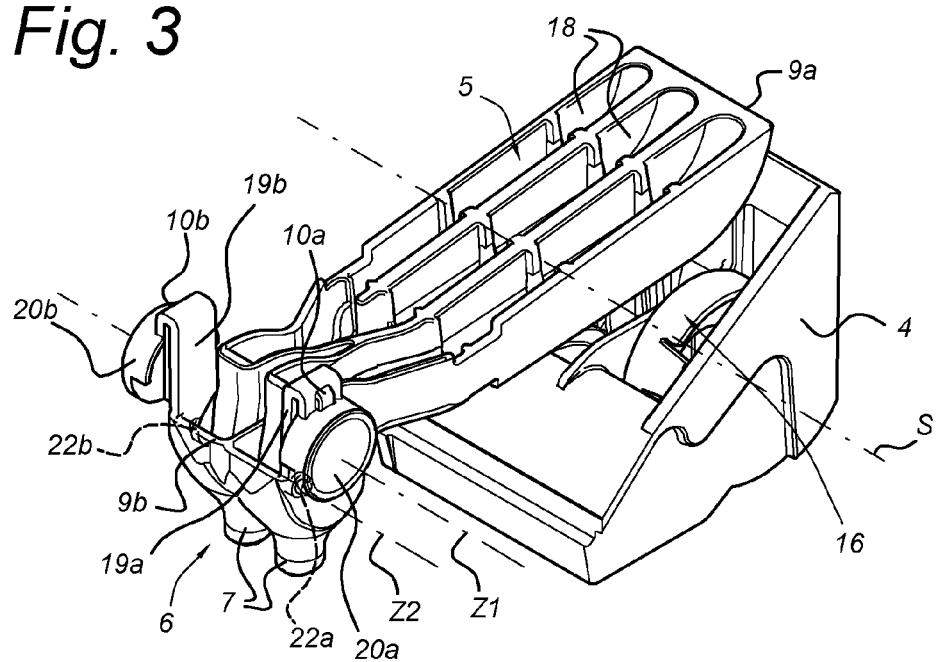
Figure 4A:
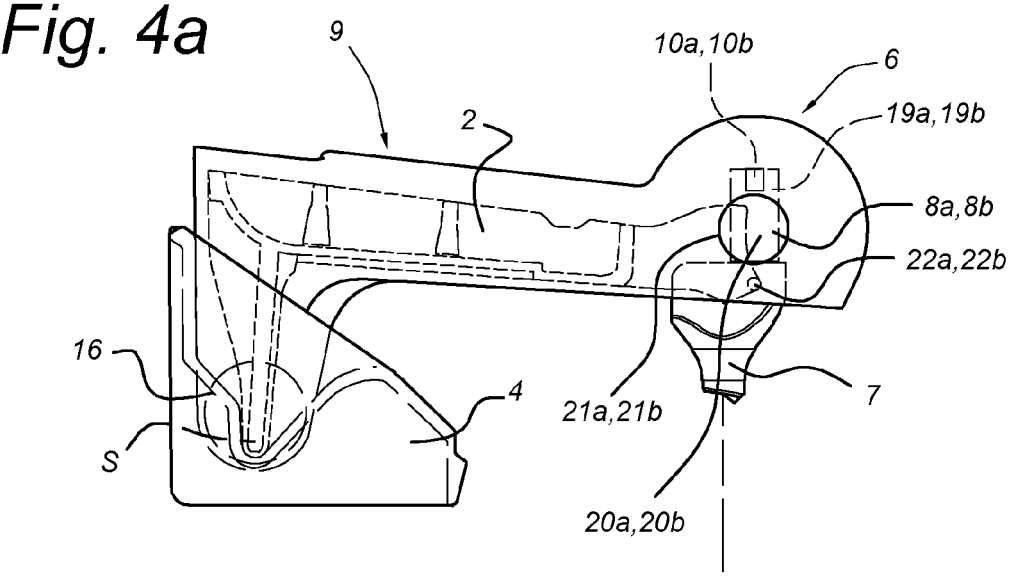
Figure 4B:
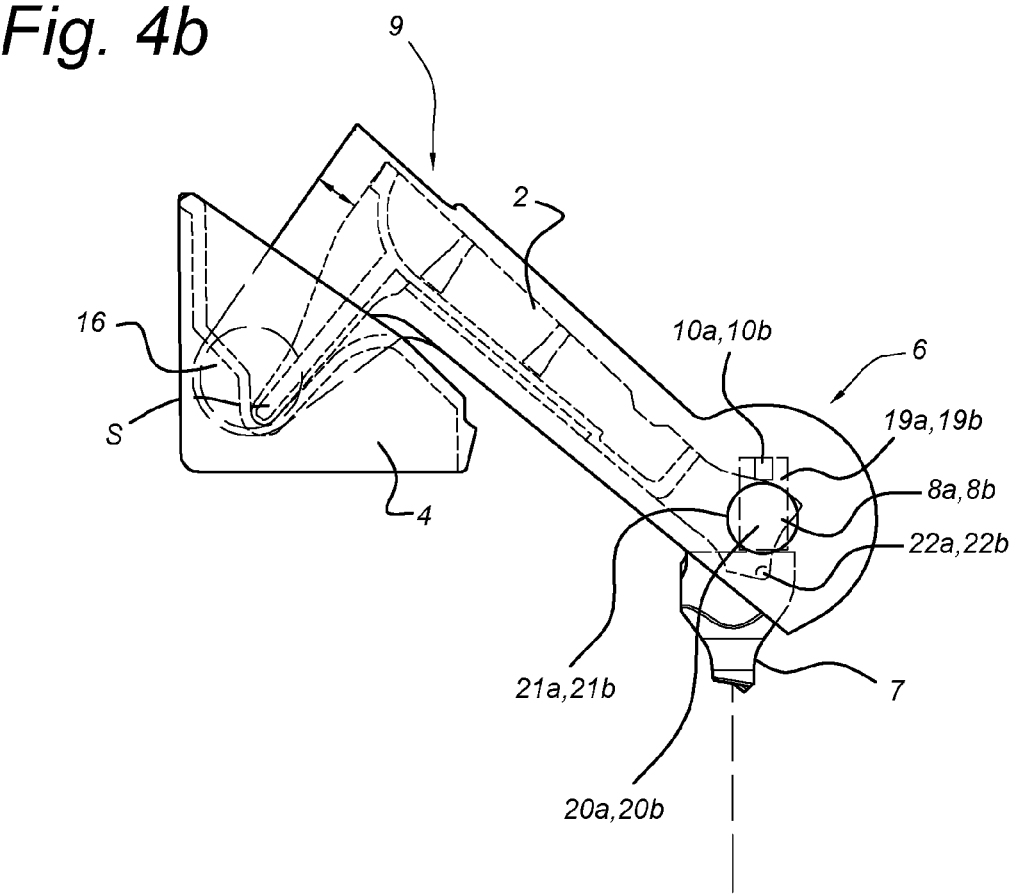
Figure 5:
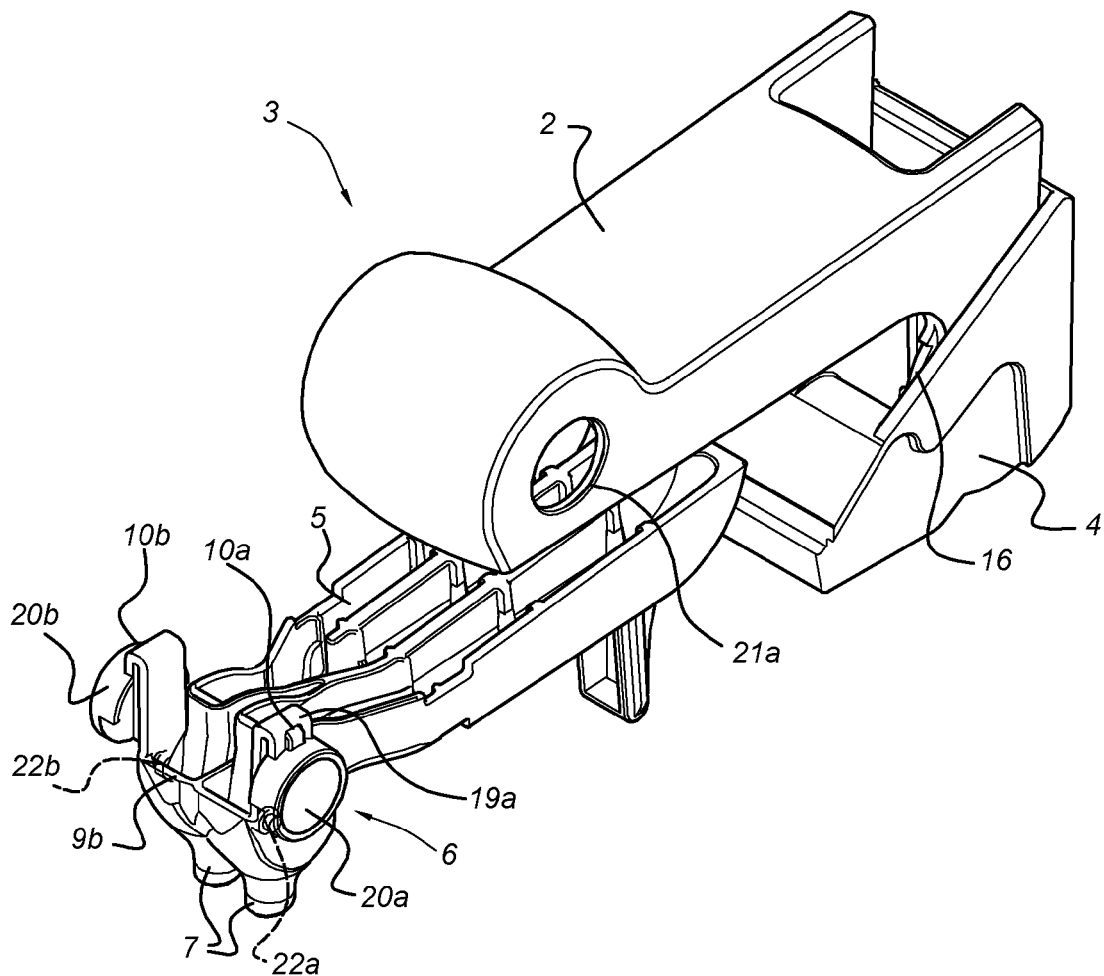
Figure 6:
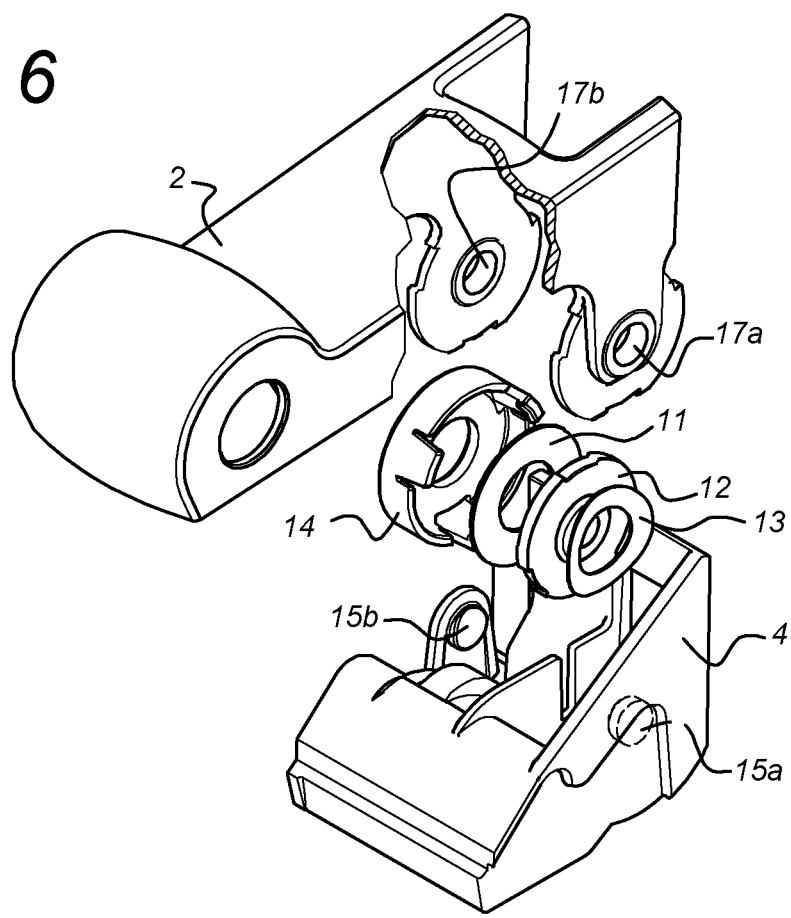
Figure 7:
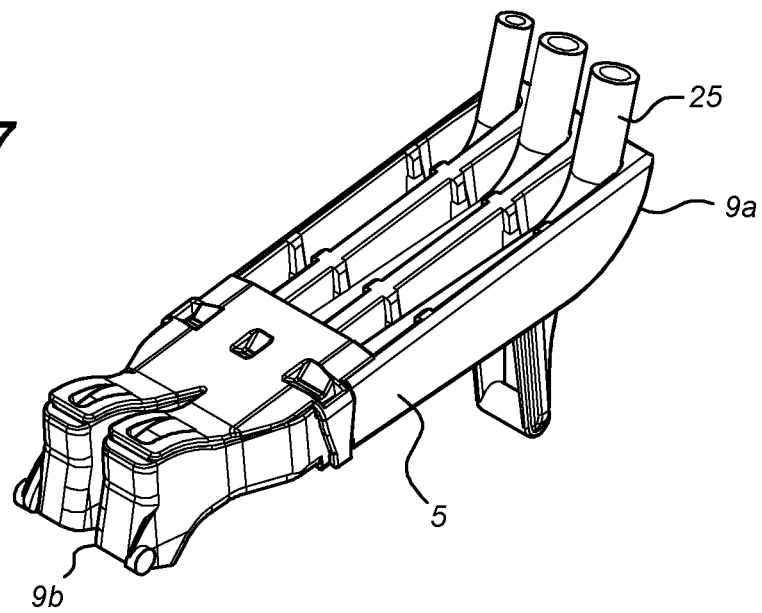

FIG. 1 shows a perspective view of a beverage preparation device with a discharge device according to the invention, FIG. 2 shows a close-up view of the discharge device of FIG. 1, FIG. 3 shows the discharge device of FIG. 2, wherein the cover of the discharge device is removed, FIG. 4a shows a side view in cross-section of a discharge device according to the invention in a first adjustment setting, FIG. 4b shows a side view in cross-section of a discharge device according to the invention in a second adjustment setting, FIG. 5 shows a perspective view of a discharge device according to the invention, wherein the adjustment arm is removed from the housing, FIG. 6 shows a perspective view of a taken-apart discharge device according to the invention, wherein the centring device for fixing the cover with respect to the housing is shown, and FIG. 7 shows a perspective view of a discharge part, in which supply ducts are positioned.

FIG. 1 shows a perspective view of a beverage preparation device 1 with a beverage outlet 3 according to the invention. The beverage outlet 3 is largely positioned outside of the beverage preparation device 1 and is arranged above a beverage container 24, such as a cup or a jug, which is supported by a support plate 23, with an adjustment arm 9 provided with a barrel-shaped delivery head 6.

The adjustment arm 9 is connected with a supply end to one or more further supply ducts of the beverage preparation device 1. After the ordering of a beverage by the user via a control panel arranged on the beverage preparation device and the preparation by the device of that beverage, the prepared beverage is supplied through the further supply duct to the supply end of the adjustment arm and subsequently led to a delivery end with a delivery head and a delivery opening 7. There the beverage leaves the beverage outlet 3. Because the user can set the height of the beverage outlet 3 with respect to the beverage container 24, it is prevented that a relatively high beverage container 24, such as a jug, does not fit under the beverage outlet 3, and that with a relatively low beverage container, wherein the distance between the delivery opening 7 and the beverage container 24 usually is relatively large, spattering occurs.

FIG. 2 shows a close-up view of the beverage outlet 3 of FIG. 1. The adjustment arm 9 is arranged in a housing 4 with a supply end 9a of a discharge part 5 and is rotatable around a hinge axis S. The delivery head 6 is also arranged pivotably around an axis Z1 with respect to a delivery end (not shown) of the adjustment arm 9. The delivery head 6 is suspended from the cover 2 via hinge means 8a, 8b. In the embodiment as shown the hinge means 8a, 8b comprise hinge projections 20a, 20b that are positioned in hinge holes 21a, 21b in the cover 2. The cover 2 is detachably connected to the discharge part 5. Due to the presence of two rotational axes S and Z1 the delivery opening 7 can maintain a same orientation with respect to the housing 4 when adjusting. As shown in FIG. 2, the rotational axes S and Z1 extend substantially horizontally during use. The rotational axes S and Z1 preferably also run parallel to each other.

As mentioned, the position of the adjustment arm 9 can be adapted manually by a user, wherein a centring device 16 arranged between the adjustment arm 9 and cover 2 on the one hand and the housing 4 on the other hand fixates the position of the adjustment arm 9 with respect to the housing.

FIG. 3 shows the discharge device of FIG. 2, wherein the cover 2 of the discharge part 5 is removed. One can see that the discharge part 5 is provided with three delivery channels 18 extending in longitudinal direction. The delivery channels 18 discharge at the delivery end 9b in two delivery openings 7 at the underside of the delivery head 6. Two of the delivery channels 18 merge at one delivery opening 7. In this way for example two beverage supply flows can be mixed to influence the composition of the final beverage. Optionally the delivery channels 18 in the discharge part 5 can serve as the fixation/guiding of beverage supply ducts. This will be described further with reference to FIG. 7.

The hinge projections 20a, 20b are provided with pressure surfaces, connected to two guidance projections 10a, 10b arranged above the hinge projections 20a, 20b. During use the guidance projections 10a, 10b enable a guided rotation of the delivery head in the cover 2, in that the guidance projections 10a, 10b can move in concentrically arranged recesses or curved grooves at the inside of the cover 2. When the pressure surfaces are pressed inwardly by the user, the connection with the cover 2 is broken in such a way, that the cover 2 can be removed from the delivery head 6. The delivery channels 18 are thus well-accessible for, for example, cleaning or maintenance. As can be seen in FIG. 3, further hinge parts 22a, 22b project in opposite directions from the adjustment arm 9 along a second pivot axis Z2 into recesses in the delivery head 6. The axis Z2 runs substantially parallel to fore mentioned axes Z1 and S. Alternatively, the recesses can be arranged in the adjustment arm 9 and the further hinge parts on the delivery head 7.

FIG. 4a shows a side view in cross-section of a beverage outlet 3 according to the invention in a first pivot position. It can be seen that the delivery opening 7 in this exemplary embodiment aligns with the vertical. The adjustment arm 9 as shown comprises two parts positioned substantially perpendicularly with respect to each other, wherein a first part is arranged hingeably in the housing 4 at point S. The second part of the adjustment arm 9 which is connected rigidly to the first part comprises the one or more delivery channels 18. The centring device 16, which will be described with reference to FIGS. 4a and 4b, fixates the adjustment arm 9 in this position.

FIG. 4b shows a side view in cross-section of a beverage outlet 3 according to the invention in a second pivot position. In FIG. 2b it can be seen that the beverage outlet 3 has been rotated downwards with respect to the first position of FIG. 4a. The delivery head 6 with the delivery opening 7 is therewith also aligned with the vertical by pivotably arranging the delivery head 6 with respect to the adjustment arm 9. By arranging the further hinge parts 22a, 22b between the delivery head 6 and the discharge part 5 dangling of the delivery head 6 is prevented, because the delivery head 6 is attached to both the cover 2 and the discharge part 5. It is relevant that the cover 2 is shiftable along the discharge part 5, otherwise rotation of the delivery head 6 around the pivot axis Z1 would not be possible. The position as shown is suitable for a beverage container with a lower height than a beverage container as used with the first position.

FIG. 5 shows a perspective view of a beverage outlet 3 according to the invention, wherein the discharge part 5 has been removed from the housing 4. The cover 2 can remain in the housing 4 when removing the discharge part 5, making maintenance or cleaning easier.

FIG. 6 shows a perspective view of a taken-apart discharge device according to the invention, wherein the centring device 16 for fixating the cover 2 with respect to the housing 4 is shown. During use the cover 2 is positioned with the cover rotation holes 17a and 17b over the cover rotation projections 15a and 15b. The centring device 16 comprises a locking ring 14 and a fastener plate 12, between which a friction ring 11 is arranged. During use, the locking ring 14, the friction ring 11 and the fastener plate 12 are positioned between the upstanding wall in the housing 4 and the cover rotation projection 15a. Between the cover rotation projection 15a and the fastener plate 12 also a disc spring 13 is positioned to generate additional pressure.

FIG. 7 shows a perspective view of a discharge part 5, in which supply ducts 25 are positioned. It is optionally possible to place one or more supply ducts 25 in the delivery channels to achieve a more controlled transport of the prepared beverage through the discharge part 5 to the delivery head. At the supply end 9a the one or more ducts 25 are connected to the further supply duct or supply ducts of the beverage preparation device. The prepared beverage is subsequently transported through the one or more ducts 25 to the delivery end 9b with the delivery head.

REFERENCE NUMERALS

1. Beverage preparation device
2. Cover
3. Beverage outlet
4. Housing
5. Discharge part
6. Delivery head
7. Delivery opening
8a. First hinge projection
8b. Second hinge projection
9. Adjustment arm
9a. Supply end adjustment arm
9b. Delivery end adjustment arm
10a. First guidance projection
10b. Second guidance projection
11. Friction ring
12. Fastener plate
13. Disc spring
14. Locking ring
15a. First cover rotation projection
15b. Second cover rotation projection
16. Centring device
17a. First cover rotation hole
17b. Second cover rotation hole
18. Delivery channel
19a. First resilient part
19b. Second resilient part
20. Support plate
21a. First hinge hole
21b. Second hinge hole
22a. First further hinge part
22b. Second further hinge part
23. Support plate
24. Beverage container
25. Supply duct
Z1. Pivot axis
Z2. Further pivot axis

The invention claimed is:

1. Beverage preparation device provided with a discharge (3) that is height-adjustable by hand, wherein the discharge (3) comprises an adjustment arm (9) that is hingeably attached to a housing (4) in a hinge point (S) with a supply end (9a), wherein the adjustment arm (9) can be pressed down or pushed up, in which said adjustment arm (9) at a delivery end (9b) is provided with a delivery head (6) with a delivery opening (7), wherein the delivery head (6) is pivotable around a pivot axis (Z) arranged perpendicularly to the adjustment arm (9) by suspension from the adjustment arm (9) via hinge means (8a, 8b) arranged at the delivery end (9b) and arranged at the pivot axis (Z), in such a way that the delivery opening (7) when pivoting the adjustment arm (9) maintains a substantially constant orientation, wherein the hinge means (8a, 8b) comprise hinge projections (20a, 20b) extending from the delivery head (6) in opposite directions along the pivot axis (Z), extending in hinge recesses (21a, 21b) comprised by the adjustment arm (9), wherein the hinge projections (20a, 20b) in the adjustment arm (9) can be pressed inwardly from the outside via the hinge recesses (21a, 21b) by connection of the hinge projections (20a, 20b) with resilient means (19a, 19b) arranged on the delivery head (6), the resilient means (19a, 19b) being resilient along the pivot axis (Z).

2. Beverage preparation device (1) according to claim 1, wherein the resilient means (19a, 19b) are arranged perpendicular to the pivot axis (Z) and are provided with guidance projections (10a, 10b) that engage curved guidance grooves in the adjustment arm (9).

3. Beverage preparation device (1) according to claim 2, wherein the adjustment arm (9) comprises a discharge part (5) and a cover (2) detachably attached to the discharge part (5).

4. Beverage preparation device (1) according to claim 3, wherein the hinge means (8a, 8b) are arranged between the delivery head (6) and the cover (2).

5. Beverage preparation device (1) according to claim 4, wherein the delivery head (6) furthermore is pivotable around a further pivot axis (Z2) arranged perpendicularly to the discharge part (5) and running parallel to the pivot axis (Z1) by suspension from the discharge part (5) via further hinge means (22a, 22b) arranged at the delivery end (9b) and arranged on the further pivot axis (Z2), wherein the cover (2) is shiftable in a longitudinal direction of the discharge part (5).

6. Beverage preparation device (1) according to claim 5, wherein the adjustment arm (9) is connected with the housing (4) in the hinge point (S) via a spring element (12, 13, 14) and a friction device (11).

7. Beverage preparation device (1) according to claim 6, wherein the friction device (11) is positioned between a locking ring (14) and a fastener plate (12), outside of which a disc spring (13) is positioned.

8. Beverage preparation device (1) according to claim 7, wherein the friction device (11) comprises a friction ring.

9. Beverage preparation device (1) according to claim 1, wherein the adjustment arm (9) comprises a discharge part (5) and a cover (2) detachably attached to the discharge part (5).

10. Beverage preparation device (1) according to claim 9, wherein the hinge means (8a, 8b) are arranged between the delivery head (6) and the cover (2).

11. Beverage preparation device (1) according to claim 9, wherein the delivery head (6) furthermore is pivotable around a further pivot axis (Z2) arranged perpendicularly to the discharge part (5) and running parallel to the pivot axis (Z1) by suspension from the discharge part (5) via further hinge means (22a, 22b) arranged at the delivery end (9b) and arranged on the further pivot axis (Z2), wherein the cover (2) is shiftable in a longitudinal direction of the discharge part (5).

12. Beverage preparation device (1) according to claim 1, wherein the adjustment arm (9) is connected with the housing (4) in the hinge point (S) via a spring element (12, 13, 14) and a friction device (11).

13. Beverage preparation device (1) according to claim 12, wherein the friction device (11) is positioned between a locking ring (14) and a fastener plate (12), outside of which a disc spring (13) is positioned.

14. Beverage preparation device (1) according to claim 12, wherein the friction device (11) comprises a friction ring.

* * * * *